United States Patent
Anthony et al.

(10) Patent No.: US 11,593,555 B1
(45) Date of Patent: Feb. 28, 2023

(54) SYSTEMS AND METHODS FOR DETERMINING CONSENSUS VALUES

(71) Applicant: INTUIT INC., Mountain View, CA (US)

(72) Inventors: Peter Anthony, Mountain View, CA (US); Preeti Duraipandian, Plano, TX (US); Tharathorn Rimchala, San Francisco, CA (US); Sricharan Kallur Palli Kumar, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/662,638

(22) Filed: May 9, 2022

(51) Int. Cl.
*G06F 40/284* (2020.01)
*G06F 40/205* (2020.01)
*G06K 9/62* (2022.01)
*G06F 16/93* (2019.01)

(52) U.S. Cl.
CPC ............ *G06F 40/205* (2020.01); *G06F 16/93* (2019.01); *G06F 40/284* (2020.01); *G06K 9/6256* (2013.01)

(58) Field of Classification Search
CPC ...... G06F 40/205; G06F 16/93; G06F 40/284; G06K 9/6256
See application file for complete search history.

(56) References Cited

U.S. PATENT DOCUMENTS

| | | | |
|---|---|---|---|
| 2016/0239487 A1* | 8/2016 | Potharaju | G06F 16/24578 |
| 2019/0205636 A1* | 7/2019 | Saraswat | G06F 16/334 |
| 2020/0104587 A1* | 4/2020 | Bhatnagar | G06V 10/75 |
| 2021/0157809 A1* | 5/2021 | Mor | G06F 16/27 |
| 2021/0201014 A1* | 7/2021 | Wu | G06K 9/6227 |

FOREIGN PATENT DOCUMENTS

CN    108897874 A  * 11/2018

OTHER PUBLICATIONS

"Bert-Extractive-Summarizer—PyPi", https://pypi.org/project/bert-extractive-summarizer/, Feb. 17, 2022, 11 pages.
Mozafari et al., "BAS: An Answer Selection Method Using BERT Language Model", arxiv.org/pdf/1911.01528, 2019, 28 pages.
Kratzwald et al. "RankQA: Neural Question Answering with Answer Re-Ranking", arXiv: 1906.03008, 2019, 10 pages.

* cited by examiner

*Primary Examiner* — Abul K Azad
(74) *Attorney, Agent, or Firm* — DLA Piper LLP (US)

(57) ABSTRACT

Systems and methods are provided to determine consensus values for duplicate fields in a document or form.

20 Claims, 10 Drawing Sheets

SYSTEMS AND METHODS FOR DETERMINING CONSENSUS VALUES

BACKGROUND OF THE DISCLOSURE

Many organizations utilize extraction services to obtain information from documents and forms automatically. These organizations typically utilize a portal, application, or other service that allows a user to upload an image of the document that he/she wants to import. The image then typically goes through a pipeline with one or more deployed models or services to classify the document and extract data from it e.g., in the form of key-value pairs. A key-value pair typically includes a key, which can be a constant or a descriptor that defines the data (e.g., color, gender, price, income, etc.), and a value, which can be a variable belonging to the set defined by the key (e.g., red, male, $500, $75,000, respectively). For example, for a tax preparation service, users often upload images of tax documents, such as W-2 forms, bank statements, or other documents and information is extracted from these images and utilized by the service to prepare the user's tax return.

Figure 1:
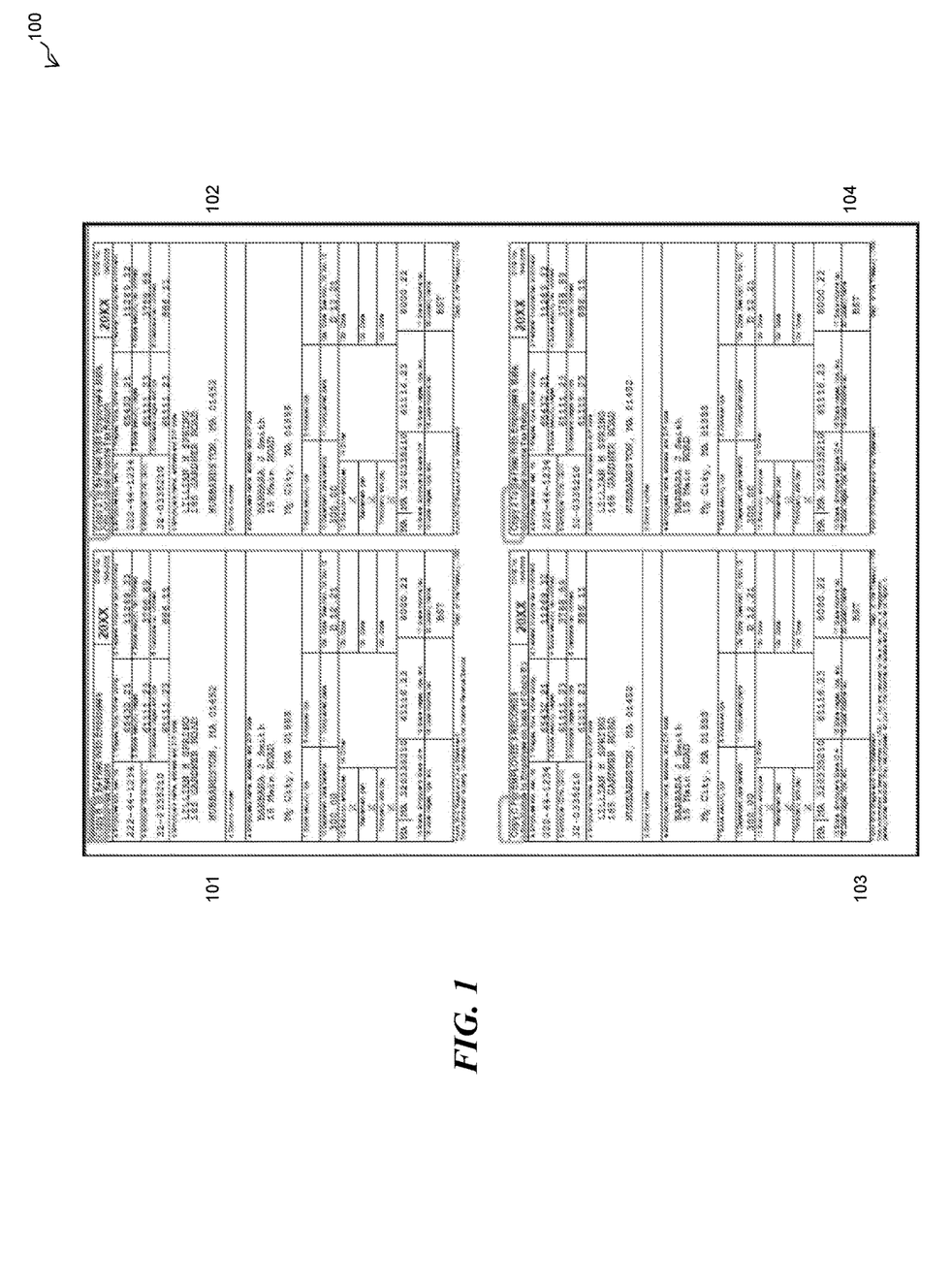
FIG. 1 shows an example of a document with multiple copies of a form on a same page of the document.

Oftentimes, however, there are documents/forms that contain multiple copies of the same document/form on a page, or the same information is presented at multiple locations on the same page. For example, as shown in FIG. 1, a document 100 includes multiple W-2 forms 101-104 on a single page. If every region of a corresponding image has acceptable quality, it is likely that a key-value extraction-engine would extract multiple key-value pairs from the image of the document (i.e., one pair from every copy present in the image). Extraction engines then have to pick a "final" value based on these multiple key-value pairs. Extraction engines currently rely on raw confidence scores that often accompany the output of optical character recognition (OCR) services, selecting the key-value pair with the highest confidence score to be the final extracted value. However, these confidence scores are not always the most representative of the extraction's accuracy. In addition, in a page with duplicate copies of a document, there may be copies that are not completely populated or even completely blank. Such inconsistencies can lead to inaccuracies in value determination, which in turn leads to an inaccurate analysis based on the extracted values and ultimately user dissatisfaction—which are undesired.

DESCRIPTION

The following detailed description is merely exemplary in nature and is not intended to limit the claimed invention or the applications of its use. Moreover, while the disclosed embodiments may be described in reference to use with a tax preparation service, it should be appreciated that the disclosed principles may apply to any service requiring the input and analysis of form fields.

Embodiments of the present disclosure relate to systems and methods for determining consensus values, including values for repeated fields (i.e., fields extracted multiple times) from documents, forms, and the like. Examples of "values" include various field values, such as income, number of withholdings, number of dependents, Social Security number, address, and many others. The systems and methods described herein can collate the plurality of values extracted for each duplicate field in a document/form (or an image of the document/form) and use various techniques to predict the final value therefrom. For example, in the case of a user's W-2 that has the same form listed multiple times on a single page (see FIG. 1), the disclosed systems and methods are able to determine a final value of redundant fields more accurately. Rather than simply choosing one of the predictions and essentially discarding the non-selected information as conventional techniques do, the systems and methods described in the present disclosure can utilize various rule-based analytical techniques to predict the final value for the field based on of the duplicate fields. In addition, the disclosed systems and methods can use various deep learning and machine learning-based solutions. In some embodiments, the rule-based and machine learning techniques can also be utilized together. Such techniques not only overcome the problems of misidentifying a field value when there are duplicate field entries or duplicate documents, but can utilize these duplicate fields to increase the accuracy as a whole.

Figure 2:
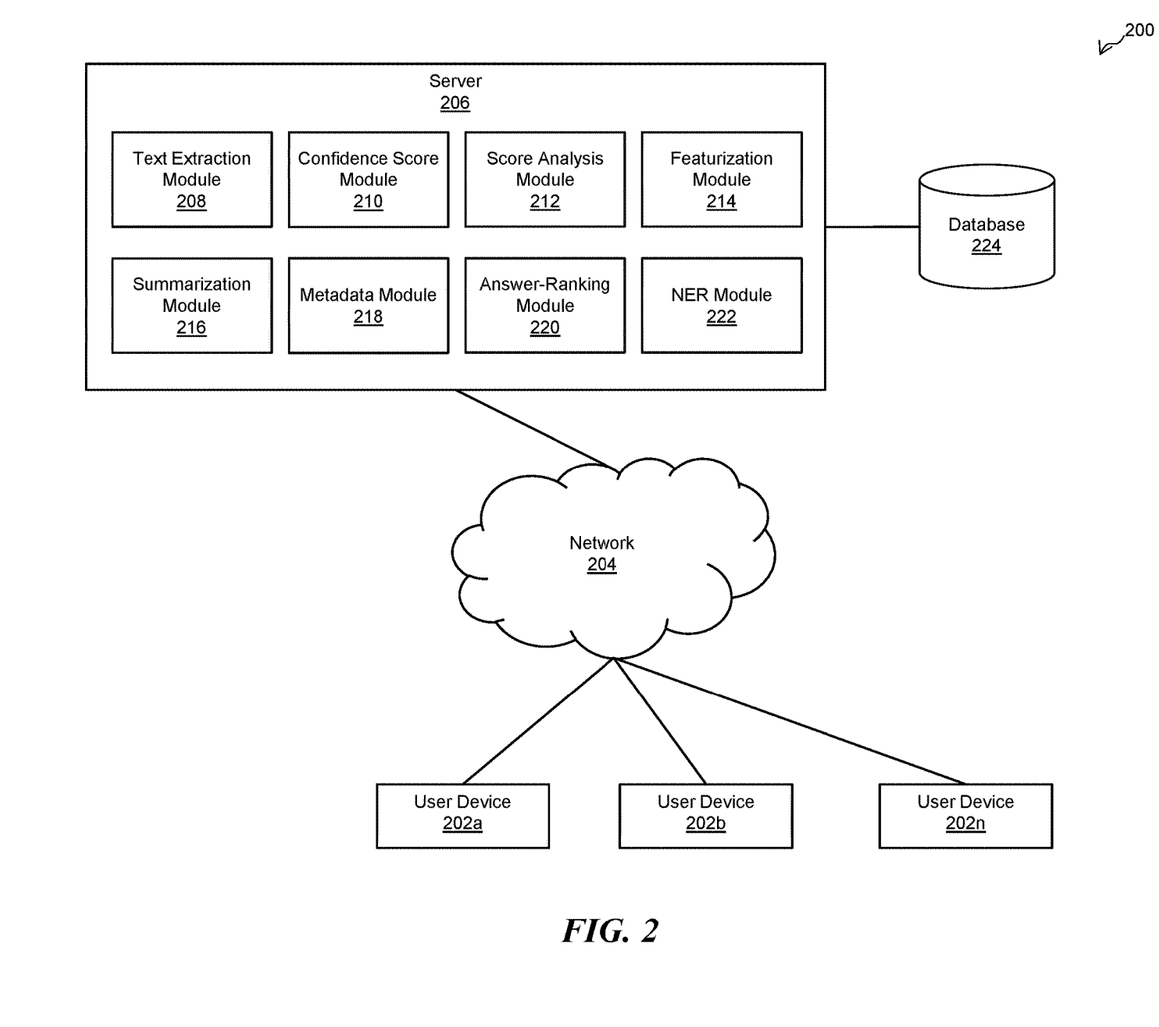
FIG. 2 is a block diagram of an example system for determining consensus values according to some embodiments of the present disclosure.

FIG. 2 is a block diagram of an example system 200 for determining consensus values according to embodiments of the present disclosure. The system can include a plurality of user devices 202a-n (generally referred to herein as a "user device 202" or collectively referred to herein as "user devices 202"), a database 224, a server 206, which are communicably coupled via a network 204. For example, a user may access a document preparation service (e.g., a tax preparation service) via a user device 202, such as via a browser, web portal, application, and the like. The user can upload documents and or images of documents, which for a tax preparation service could include tax forms (e.g., W-2) and other forms, which are then transmitted over the network 204 to the server 206 for analysis. In some embodiments, the system 200 can include any number of user devices 202. For example, for an organization that manages accounting software, personal finance software, tax preparation software, etc. and associated databases, there may be an extensive user base with thousands or even millions of users that connect to the system 200 via their user devices 202. The documents, images of documents, and information extracted from the documents and images can be maintained in the database 224 for access by the server 206. In addition, the database 224 can store pre-defined key-value sets associated with specific types of forms and documents. For example, the database 224 can store a pre-defined key-value set for a W-2, where the set specifies certain key-value pairs that are expected (e.g., Box 1 is for income and then an expected numerical value).

A user device 202 can include one or more computing devices capable of receiving user input, transmitting and or receiving data via the network 204, and or communicating with the server 206. In some embodiments, a user device 202 can be a conventional computer system, such as a desktop or laptop computer. Alternatively, a user device 202 can be a device having computer functionality, such as a personal digital assistant (PDA), a mobile telephone, a smartphone, tablet or other suitable device. In some embodiments, a user device 202 can be the same as or similar to the computing device 1000 described below with respect to FIG. 10. In some embodiments, the system 200 can include any number of user devices 202.

The network 204 can include one or more wide areas networks (WANs), metropolitan area networks (MANs), local area networks (LANs), personal area networks (PANs), or any combination of these networks. The network 204 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 204 can also use standard communication technologies and/or protocols.

The server 206 may include any combination of one or more of web servers, mainframe computers, general-purpose computers, personal computers, or other types of computing devices. The server 206 may represent distributed servers that are remotely located and communicate over a communications network, or over a dedicated network such as a local area network (LAN). The server 206 may also include one or more back-end servers for carrying out one or more aspects of the present disclosure. In some embodiments, the server 206 may be the same as or similar to server 900 described below in the context of FIG. 9.

As shown in FIG. 2, the server 206 includes one or more of a text extraction module 208, a confidence score module 210, a score analysis module 212, a featurization module 214, a summarization module 216, a metadata module 218, an answer-ranking module 220, and a NER module 222. The server 206 can receive documents and or images of documents from a user device 202 and analyze the documents and or images of documents via these modules.

The text extraction module 208 comprises one or more extractors configured to extract text (e.g., typed, handwritten, etc.) from images of documents or scanned documents via optical character recognition (OCR) techniques. In some embodiments, the text extraction module 208 can use Amazon® Textract or other similar OCR engines. In some embodiments, the text extraction module 208 can perform key-value extraction, where the extracted output includes a key and a value for said key, as well as a confidence score associated with the extracted key-value pair. For example, the text extraction module 208 outputs an identified word or phrase and an associated confidence score for that word or phrase. In the case of a phrase of multiple words, the text extraction module 208 can average the confidence score of each word to compute a confidence score for the phrase as a whole. Additionally, the text extraction module 208 provides a match confidence score, which represents the probability that the text of the key is properly matched to the text of the value.

The confidence score module 210 is configured to transform the confidence scores output by the text extraction module 208 into an accuracy value. The confidence score module 210 can utilize a machine learning algorithm (e.g., Tree-based and/or classifier-based model) that ingests the confidence scores and translates them into an extraction accuracy value. The machine learning algorithm can be trained on various extracted words and phrases and their associated confidence scores to predict the likelihood that the extraction is accurate. In addition, the module's 210 machine learning algorithm can also reference various metadata associated with the extractions and the document image, such as e.g., dimensions of an associated bounding box and the length of the textual string. In other words, the algorithm calibrates the confidence scores from the OCR engine with respect to the precision observed on actual extractions.

The score analysis module 212 is configured to utilize various rule-based analytical techniques to predict a final field value from a plurality of field values extracted by the text extraction module 208. The score analysis module 212 can process both confidence scores for the extracted text generated by the text extraction module 208 or accuracy values generated by the confidence score module 210. In some embodiments, the score analysis module 212 is configured to apply a majority vote technique to various values for a duplicate field in a received document image. Once various key-value pairs are extracted by the text extraction module 208, the score analysis module 212 maps the key-value pairs to a pre-defined key set for the relevant document, takes a majority vote for the extracted value, and assigns the value to the associated key. The value with the most votes is determined to be the final value. For example, if values of 100, 100, 10, and 0 are extracted for a duplicate field, the majority vote technique would determine that 100 should be the value. Additionally, in some embodiments, the confidence scores could be used to weigh the votes or break a tie. For example, if there were values of 100, 100, 10, and 10, but the confidence scores of the 100's were higher, then 100 could be determined to be the final value of the field.

The score analysis module 212 is also configured to apply a key-similarity algorithm to scores to determine a final output value for the duplicated field. A key-similarity algorithm includes mapping the extracted key-value pairs to a pre-defined key set for the relevant document and calculating an edit distance (e.g., a Levenshtein distance) between a key of the key set and the key for each extracted key-value pair. The key-value pair with the lowest score or edit distance is determined to be the final value for the respective key of the key set corresponding to the duplicated field. Generally, the edit distance between two strings is lower if the strings are more similar to each other.

The score analysis module 212 is also configured to apply a sorted calibrated confidence score algorithm, where the score analysis module 212 selects the key-value pair with the best (e.g., highest) accuracy value determined by the confidence score model 210. The score analysis module 212 is also configured to identify the key-value pair with the highest match confidence and utilize that value as the final output.

The score analysis module 212 is also configured to apply combinations of these techniques, such as e.g., applying addition and or multiplication to the confidence scores, match confidence scores, accuracy values, etc., or by determining a weighted average.

The featurization module 214 is configured to encode the information in the text of key-value pairs generated by the text extraction module 208 so that the key-value pairs can be analyzed by other modules. In some embodiments, the featurization module 214 is configured to vectorize key-value pairs, such as e.g., via a term frequency-inverse document frequency (TFIDF) technique. The vectorized grouping of key-value pairs can take the following structure: <Key 1> <Value 1> <Key 2> <Value 2> . . . <Key N> <Value N>. The vectorized grouping can be created by vectorizing each individual key-value pair and then concatenating the pairs. In some embodiments, the featurization module 214 is also configured to tokenize key-value pairs, such as e.g., via a bidirectional encoder representations from transformers (BERT) tokenizer. The tokenized grouping of key-value pairs can take the following structure: <CLS> <Key 1> <Value 1> <Key 2> <Value 2> . . . <Key N> <Value N> <SEP>, where <CLS> indicates the beginning of a body of text that is organized into sentences, while <SEP> indicates the beginning of a new sentence.

The summarization module 216 is configured to apply a machine learning-based summarization model to an encoded set of key-value pairs, such as the ones generated by the featurization module 214. A summarization model is trained to predict the correct key-value pair from the encoded set of pairs. In some embodiments, the summarization module 216 can utilize a natural language processing (NLP)-based summarization model, such as e.g., an extractive summarization model, which accepts the concatenated string of duplicate key-value pairs as an input and summarizes the inputs to generate an output. An extractive summarization model is non-generative, meaning that the model selects a key-value pair from among the set provided as inputs. In some embodiments, the summarization module 216 can utilize an abstractive summarization model, which is a generative model that does not select sentences from the originally given text passage to create a summary. Rather, an abstractive summarization model can produce a paraphrasing of the main contents of the given text (i.e., the concatenated key-value pairs) using a vocabulary set different from the original input. In other words, an abstractive summarization model produces an output that is not necessarily taken verbatim from any of the key-value pairs. In some embodiments, a BERT extractive summarizer can be used to either select a key-value pair or generate a key-value pair based on the analyzed key-value pairs.

The metadata module 218 is configured to obtain various metadata from a document that is associated with the key-value pairs extracted by the text extraction module 208. For example, the metadata module 208 can obtain bounding box coordinates and textual string lengths. For individual strings, metadata can include the fraction of characters that are letters, the fraction of characters that are numbers, the fraction of characters that are special (e.g., non-alphanumeric), width and height values of bounding boxes, whether the string contains a decimal point or commas, the number of digits after a decimal point, and whether any of the digits are non-zero. For key-value pairs, metadata can include features reflecting the relative positions of the key and value bounding boxes, e.g., how far separated they are vertically and horizontally. Additionally, document-level metadata can include the number of fields that were extracted overall.

The answer-ranking module 220 is a machine learning model that receives features as inputs to predict if a candidate extraction is a correct extraction. The features can include metadata (i.e., from the metadata module 218), key-similarity scores (e.g., Levenshtein distances), or confidence scores, for example. In some embodiments, the answer-ranking module 220 can include a classifier with either binary-loss or with Pairwise Loss as described in Bernhard Kratzwald, Anna Eigenmann, Stefan Feuerriegel: "RankQA: Neural Question Answering with Answer Re-Ranking," 2019; [arXiv:1906.03008]. In some embodiments, the answer-ranking module 220 can also be configured to use an answer selection model, which is trained to select the best "answer" given a question. An answer selection model as described in Jamshid Mozafari, Afsaneh Fatemi, Mohammad Ali Nematbakhsh, "BAS: An Answer Selection Method Using BERT Language Model," 2019; [arXiv:1911.01528].

The NER module 222 is configured to map values to their respective field-titles and can use various constraints to further increase accuracy. Constraints can include e.g., a stipulation that two different values cannot both be tagged as an accurate value or that certain entities are unique (e.g., Social Security numbers). In some embodiments, the constraints can be incorporated as regularization terms e.g., to prevent overfitting, or used to filter candidate key-value pairs (e.g., group all identical terms, such as repeated Social Security numbers, together as one group). In one or more embodiments, the NER model is applied only to the feasible candidates.

Figure 3:
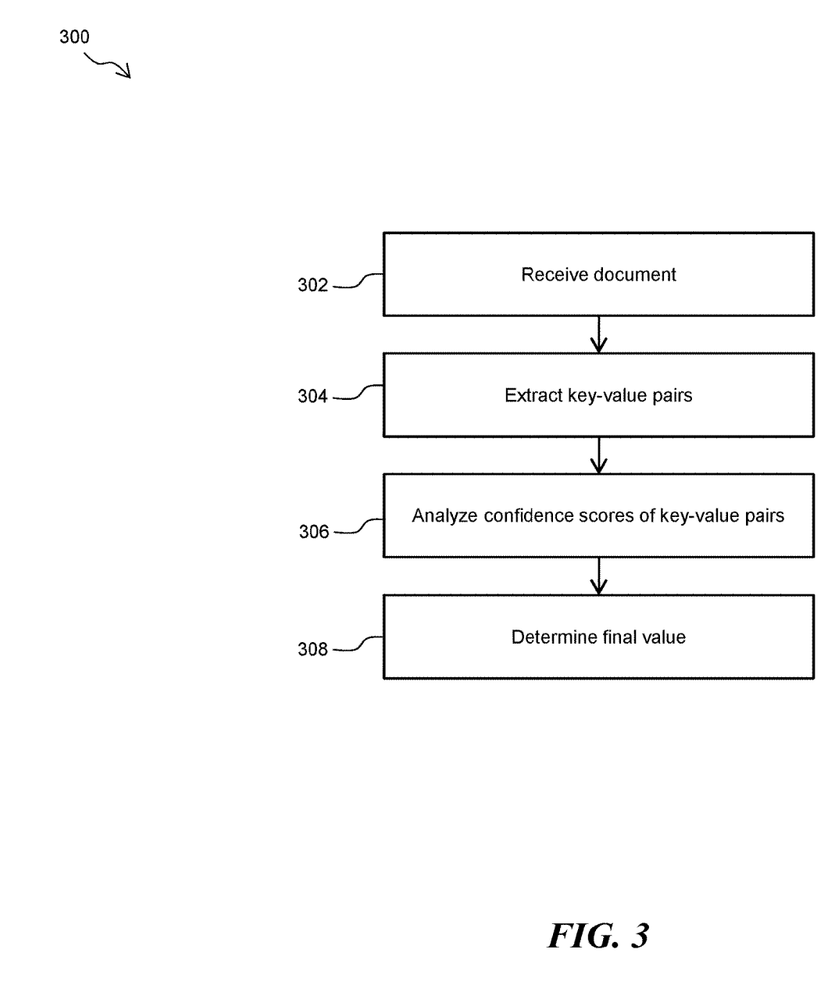
FIG. 3 is a flow diagram showing an example process for determining consensus values using a rule-based approach according to some embodiments of the present disclosure.

FIG. 3 is a flow diagram showing an example process 300 for determining consensus values using a rule-based approach according to some embodiments of the present disclosure. In some embodiments, process 300 is performed within the system 200 of FIG. 2 e.g. by the server 206 and its various modules. At block 302, the server 206 receives a document, such as an image or a scanned version of the document, from a user device 202. In some embodiments, the user may have uploaded the document via a web portal, an application, a web browser, or similar platform. At block 304, the text extraction module 208 extracts a plurality of key-value pairs from the document via an OCR engine, such as e.g., Amazon® Textract. Each key-value pair can include a key, a value, a confidence score for the text, and a match confidence score. As discussed above in relation to FIG. 2, the confidence score is associated with the actual text value and the match confidence score represents the probability that the text of the key is properly matched to the text of the value. In an example where the received document is a W-2 as shown in FIG. 1, the text extraction module 208 would extract four key-value pairs for a duplicate field, such as the income field, and each key-value pair would also have a confidence score and a match confidence score.

At block 306, the score analysis module 212 analyzes the confidence scores of the extracted key-value pairs. Analyzing the confidence scores can include applying various rule-based analytical techniques. In some embodiments, the score analysis module 212 can apply a majority vote technique to the extracted values, which includes mapping the key-value pairs to a pre-defined key set associated with the relevant document type, performing a majority vote for the extracted values, and assigning the value present in the majority of key-value pairs to the associated key. In some embodiments, analyzing the confidence scores of the key-value pairs can include applying a key-similarity algorithm. Applying the key-similarity algorithm can include mapping the extracted key-value pairs to a pre-defined key set for the relevant document and calculating an edit distance (e.g., a Levenshtein distance) between the relevant keys. The final value is obtained from the key-value pair with the lowest edit distance. In some embodiments, analyzing the confidence scores of the key-value pairs can include applying combinations of these techniques, such as applying addition and or multiplication to the confidence scores, match confidence scores, accuracy values, etc., or by determining a weighted average. At block 308, the selected value is determined to be the final value, which can then be used for additional processing, such as preparing a tax return on behalf of the user. The final value can also be displayed on the user device 202 to confirm its accuracy.

Figure 4:
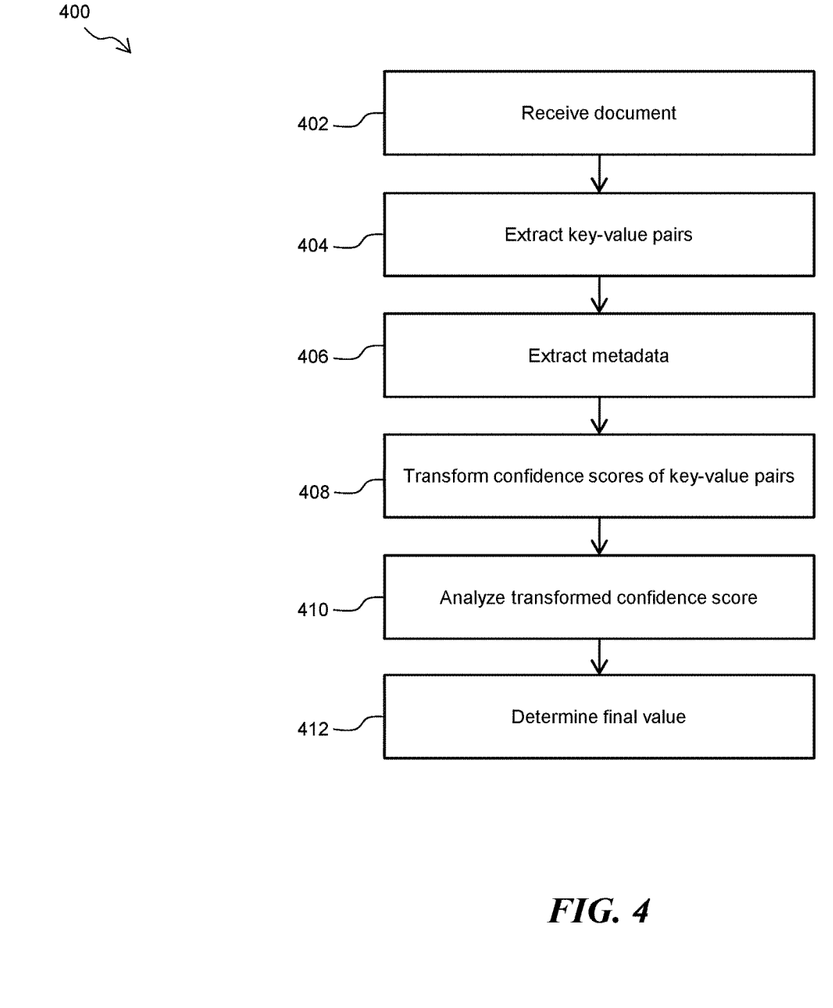
FIG. 4 is a flow diagram showing another example process for determining consensus values using a rule-based approach according to some embodiments of the present disclosure.

FIG. 4 is a flow diagram showing another example process 400 for determining consensus values using a rule-based approach according to some embodiments of the present disclosure. In some embodiments, process 400 is performed within the system 200 of FIG. 2 e.g., by the server 206 and its various modules. At block 402, the server 206 receives a document, such as an image or a scanned version of the document, from a user device 202. At block 404, the text extraction module 208 extracts a plurality of key-value pairs from the document via an OCR engine. Each key-value pair can include a key, a value, a confidence score for the text, and a match confidence score. At block 406, the metadata module 218 extracts metadata from the document for the extracted key-value pairs, such as e.g., textual string lengths and bounding box coordinates. At block 408, the confidence score module 210 transforms each of the confidence scores of the plurality of key-value pairs into an accuracy value. Transforming a confidence score into an accuracy value can include, via a machine learning algorithm, predicting the likelihood that an extracted value is accurate based on the confidence scores themselves and the extracted metadata. At block 410, the score analysis module 212 analyzes the transformed scores (i.e., the accuracy values determined by the confidence score module 210) by sorting the accuracy values and identifying the highest one. At block 412, the score analysis module 212 determines that the value with the highest accuracy value is the final value.

Figure 5:
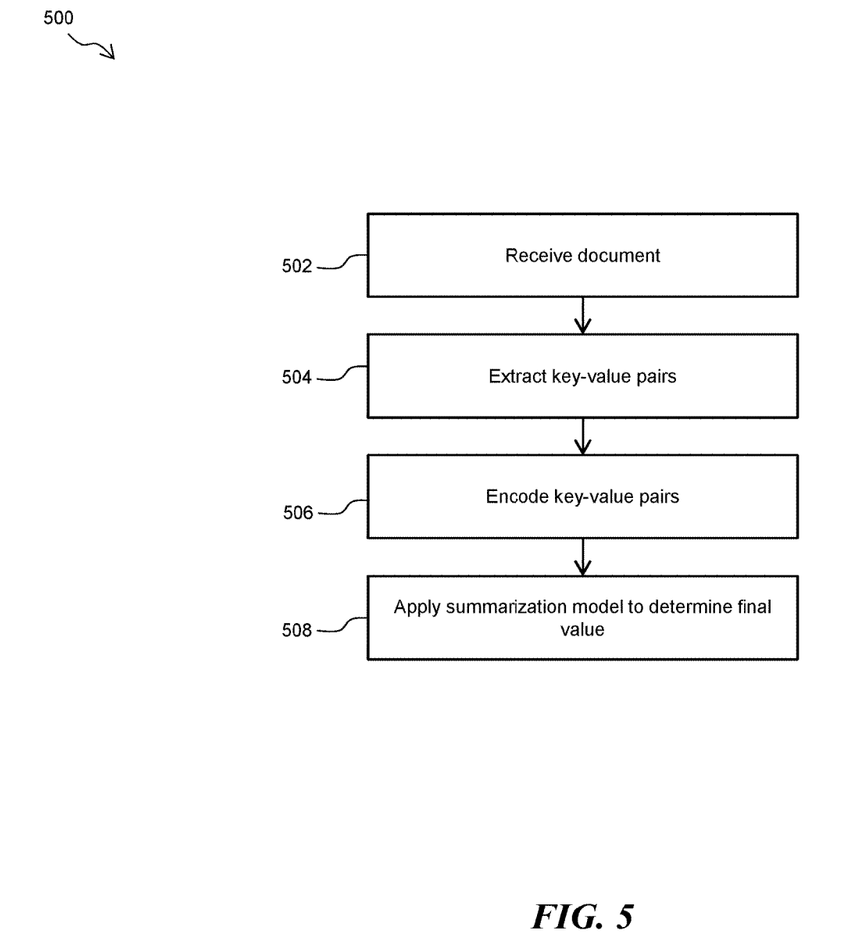
FIG. 5 is a flow diagram showing an example process for determining consensus values using a summarization model according to some embodiments of the present disclosure.

FIG. 5 is a flow diagram showing an example process 500 for determining consensus values using a summarization model according to some embodiments of the present disclosure. In some embodiments, process 500 is performed within the system 200 of FIG. 2 e.g., by the server 206 and its various modules. At block 502, the server 206 receives a document, such as an image or a scanned version of the document, from a user device 202. At block 504, the text extraction module 208 extracts a plurality of key-value pairs from the document via an OCR engine. Each key-value pair can include a key, a value, a confidence score for the text, and a match confidence score. At block 506, the featurization module 214 encodes the key-value pairs extracted by the text extraction module 208. In some embodiments, encoding the key-value pairs can include vectorizing each of the key-value pairs by e.g., a TFIDF technique, and concatenating the vectorized key-value pairs into a single vector. In some embodiments, encoding the key-value pairs can include tokenizing the key-value pairs e.g., with a BERT tokenizer.

At block 508, the summarization module 216 applies a machine learning-based summarization model to the encoded key-value pairs to determine a final value for the field. In some embodiments, applying the summarization model can include applying an NLP-based summarization model, e.g., an extractive summarization model, which accepts the encoded key-value pairs as an input and summarizes the inputs to generate an output. In some embodiments, applying the summarization model can include applying an abstractive summarization model, which produces a paraphrasing of the main contents of the encoded key-value pairs.

Figure 6:
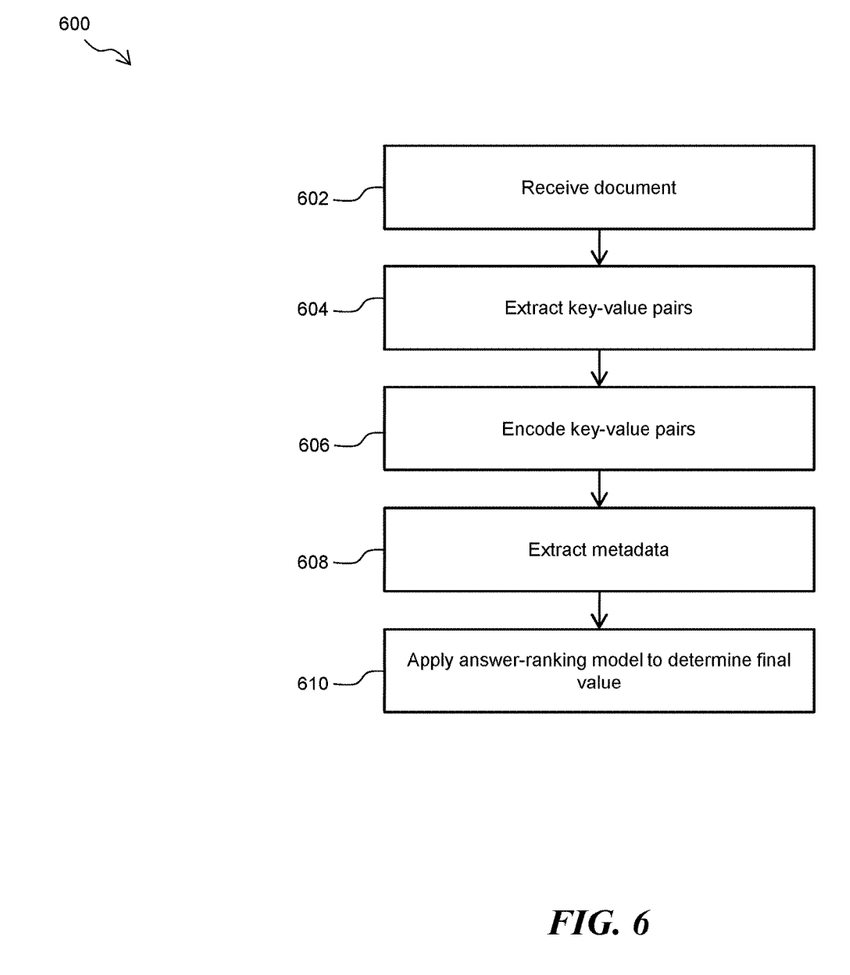
FIG. 6 is a flow diagram showing an example process for determining consensus values using an answer-ranking model according to some embodiments of the present disclosure.

FIG. 6 is a flow diagram showing an example process 600 for determining consensus values using an answer-ranking model according to some embodiments of the present disclosure. In some embodiments, process 600 is performed within the system 200 of FIG. 2, e.g., by the server 206 and its various modules. At block 602, the server 206 receives a document, e.g., an image or a scanned version of the document, from a user device 202. At block 604, the text extraction module 208 extracts a plurality of key-value pairs from the document via an OCR engine. Each key-value pair can include a key, a value, a confidence score for the text, and a match confidence score. At block 606, the featurization module 214 encodes the key-value pairs extracted by the text extraction module 208. In some embodiments, encoding the key-value pairs can include vectorizing each of the key-value pairs, e.g., via a TFIDF technique, and concatenating the vectorized key-value pairs into a single vector or tokenizing the key-value pairs, e.g., with a BERT tokenizer.

At block 608, the metadata module 218 extracts metadata from the document for the extracted key-value pairs, e.g., textual string lengths and bounding box coordinates. At block 610, the answer-ranking module 220 applies an answer-ranking model to the encoded key-value pairs and the extracted metadata to determine a final value for the duplicate field. Applying the answer-ranking model can include providing the metadata, key-similarity scores, and confidence scores as an input to a machine learning-based answer-ranking model that predicts if an extraction is accurate. In some embodiments, the answer-ranking model can include a classifier that utilizes various loss functions, e.g., a binary-loss function or a Pairwise Loss function.

Figure 7:
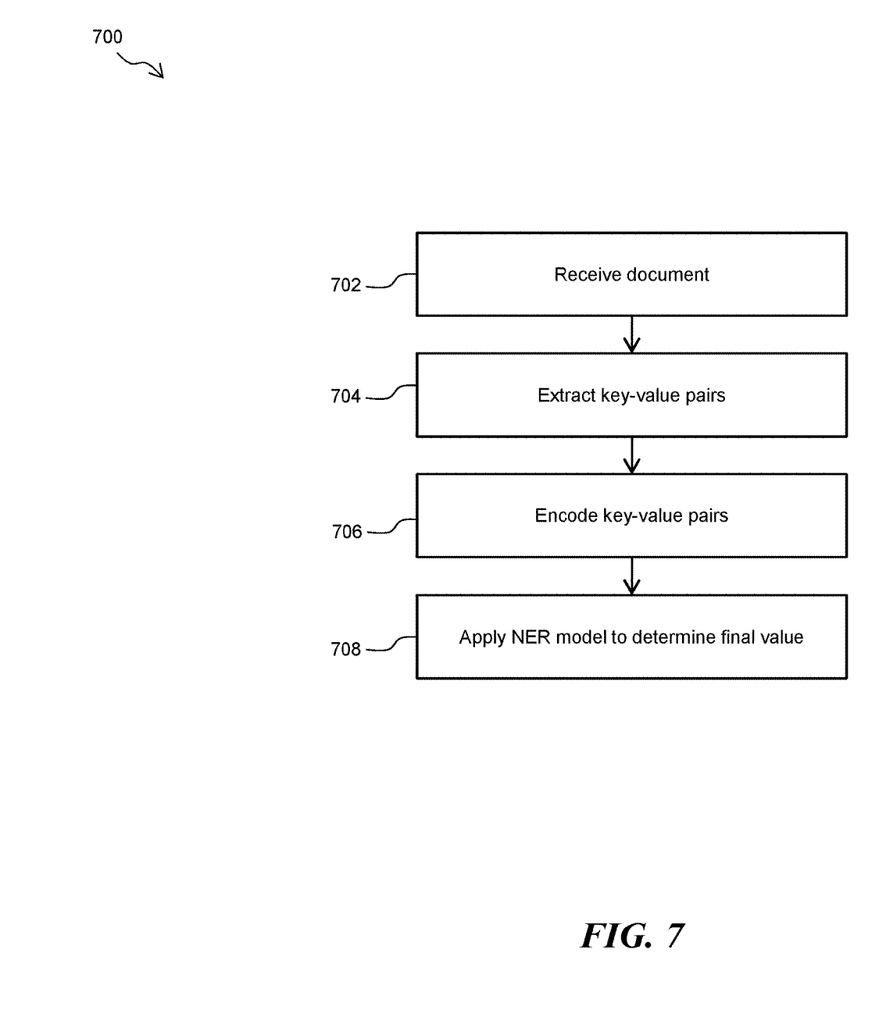
FIG. 7 is a flow diagram showing an example process for determining consensus values using a named entity recognition (NER) model according to some embodiments of the present disclosure.

FIG. 7 is a flow diagram showing an example process 700 for determining consensus values using a named entity recognition (NER) model according to some embodiments of the present disclosure. In some embodiments, process 700 is performed within the system 200 of FIG. 2, e.g., by the server 206 and its various modules. At block 702, the server 206 receives a document, e.g., an image or a scanned version of the document, from a user device 202. At block 704, the text extraction module 208 extracts a plurality of key-value pairs from the document via an OCR engine. Each key-value pair can include a key, a value, a confidence score for the text, and a match confidence score. At block 706, the featurization module 214 encodes the key-value pairs extracted by the text extraction module 208. In some embodiments, encoding the key-value pairs can include vectorizing each of the key-value pairs, e.g., via a TFIDF technique, and concatenating the vectorized key-value pairs into a single vector or tokenizing the key-value pairs, e.g., with a BERT tokenizer.

At block 708, the NER module 222 applies a NER model to the encoded key-value pairs to determine a final value for the field. In some embodiments, applying the NER model can include using various constraints to map values to their respective field-titles. In some embodiments, the constraints can be incorporated as regularization terms, e.g., to prevent overfitting, or used to filter candidate key-value pairs (e.g., group all identical terms, such as repeated Social Security numbers, together as one group). Then, the NER model can be applied only to the feasible candidates, and the output of the NER model is determined to be the final value for the field.

Figure 8:
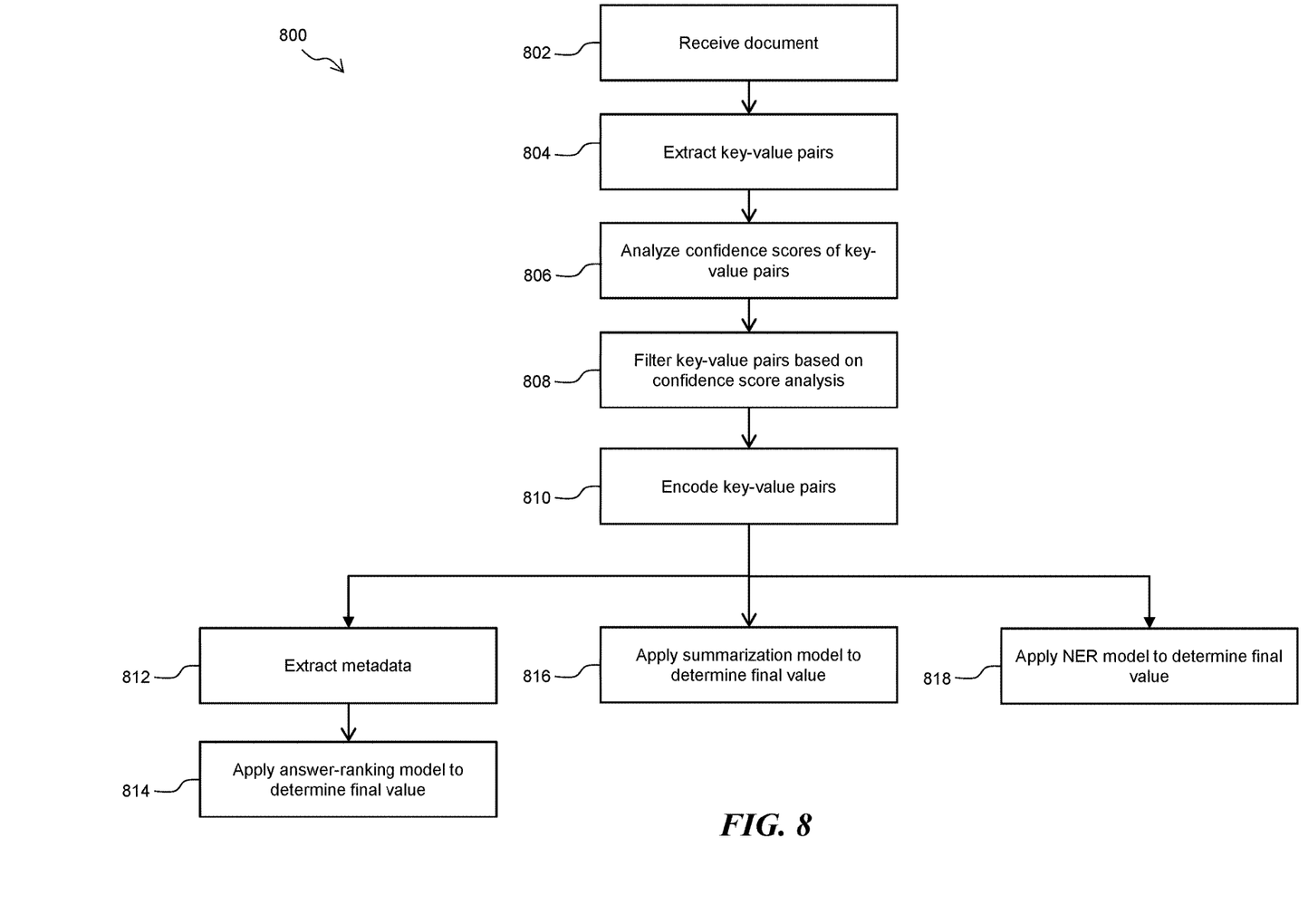
FIG. 8 is a flow diagram showing an example process for determining consensus values using a combination approach according to some embodiments of the present disclosure.

FIG. 8 is a flow diagram showing an example process 800 for determining consensus values using a combination approach according to some embodiments of the present disclosure. In some embodiments, process 800 is performed within the system 200 of FIG. 2, e.g., by the server 206 and its various modules. Process 800 involves a combination of rule-based analytical techniques and machine learning-based techniques. At block 802, the server 206 receives a document, e.g., an image or a scanned version of the document, from a user device 202. At block 804, the text extraction module 208 extracts a plurality of key-value pairs from the document via an OCR engine. Each key-value pair can include a key, a value, a confidence score for the text, and a match confidence score.

At block 806, the score analysis module 212 analyzes the confidence scores of the extracted key-value pairs. In some embodiments, this analysis can be done to generate candidate key-value pairs. In other words, certain key-value pairs can be selected as potential candidates for the final value while others are filtered out (block 808). In some embodiments, the score analysis module 212 can filter out key-value pairs with a confidence score or match confidence score below a certain threshold. In some embodiments, the score analysis module 212 can apply a majority vote technique to the extracted values and select a certain number of pairs as candidates, e.g., the top two. In some embodiments, the score analysis module 212 can apply a key-similarity algorithm, calculating an edit distance from a pre-defined key set for each key-value pair. In some embodiments, key-value pairs with a score above a certain threshold can be selected as candidates. In other embodiments, a predefined number of top-scoring candidates can be selected (e.g., the top two). In some embodiments, analyzing the confidence scores of the key-value pairs can include applying combinations of these techniques, e.g., by determining a weighted score based on various of the aforementioned scores and selecting key-value pairs as candidates based on the weighted scores. At block 808, based on the confidence score analysis performed at block 806, the score analysis module 212 filters out key-value pairs.

At block 810, the featurization module 214 encodes the candidate key-value pairs determined by score analysis module 212. In some embodiments, encoding the key-value pairs can include vectorizing or tokenizing each of the key-value pairs. Once the candidate key-value pairs are encoded into either a vectorized or tokenized format, various potential machine learning-based techniques can be used to perform candidate selection and determine a final value for the field, such as an answer-ranking branch (812-814), a summarization branch (816), and a NER model branch (818).

In the case of applying answer-ranking, at block 812, the metadata module 218 extracts metadata (e.g., textual string lengths and bounding box coordinates) from the document for the candidate key-value pairs. At block 814, the answer-ranking module 220 applies an answer-ranking model to the encoded candidate key-value pairs and the extracted metadata to determine a final value for the duplicate field.

In the case of applying a summarization model to the candidate key-value pairs, at block 816, the summarization module 216 applies a machine learning-based summarization model to the encoded candidate key-value pairs to determine a final value for the field. The summarization model can include one or more of an extractive summarization module or an abstractive summarization module.

In the case of applying a NER model, at block 818, the NER module 222 applies a NER model to the encoded key-value pairs to determine a final value for the field. In some embodiments, applying the NER model can include using various constraints to map values to their respective field-titles. In some embodiments, the constraints can be incorporated as regularization terms, e.g., to prevent over-fitting, or used to filter candidate key-value pairs (e.g., group all identical terms, such as repeated Social Security numbers, together as one group). In one or more embodiments, the NER model is applied only to the feasible candidates, and the output of the NER model is determined to be the final value for the field.

Figure 9:
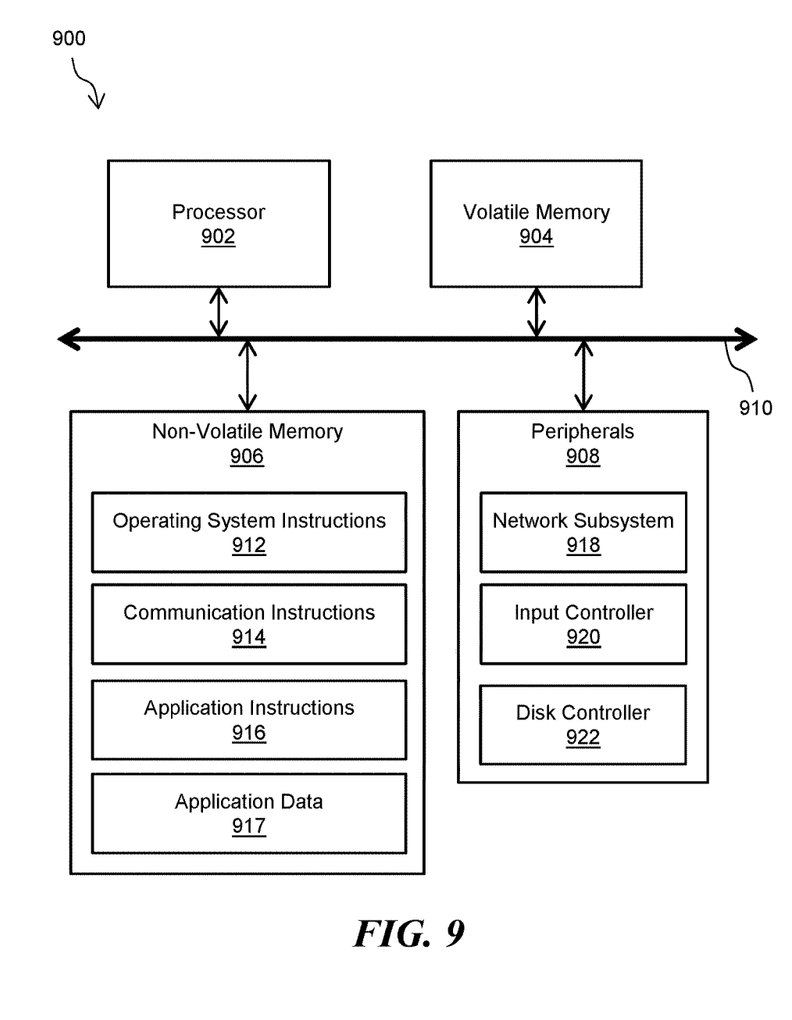
FIG. 9 is an example server device that can be used within the system of FIG. 1 according to an embodiment of the present disclosure.

FIG. 9 is a diagram of an example server device 900 that can be used within system 200 of FIG. 2. Server device 900 can implement various features and processes as described herein. Server device 900 can be implemented on any electronic device that runs software applications derived from compiled instructions, including without limitation personal computers, servers, smart phones, media players, electronic tablets, game consoles, email devices, etc. In some implementations, server device 900 can include one or more processors 902, volatile memory 904, non-volatile memory 906, and one or more peripherals 908. These components can be interconnected by one or more computer buses 910.

Processor(s) 902 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 910 can be any known internal or external bus technology, including but not limited to ISA, EISA, PCI, PCI Express, USB, Serial ATA, or FireWire. Volatile memory 904 can include, for example, SDRAM. Processor 902 can receive instructions and data from a read-only memory or a random access memory or both. Essential elements of a computer can include a processor for executing instructions and one or more memories for storing instructions and data.

Non-volatile memory 906 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 906 can store various computer instructions including operating system instructions 912, communication instructions 914, application instructions 916, and application data 917. Operating system instructions 912 can include instructions for implementing an operating system (e.g., Mac OS®, Windows®, or Linux). The operating system can be multi-user, multiprocessing, multitasking, multithreading, real-time, and the like. Communication instructions 914 can include network communications instructions, for example, software for implementing communication protocols, such as TCP/IP, HTTP, Ethernet, telephony, etc. Application instructions 916 can include instructions for various applications. Application data 917 can include data corresponding to the applications.

Peripherals 908 can be included within server device 900 or operatively coupled to communicate with server device 900. Peripherals 908 can include, for example, network subsystem 918, input controller 920, and disk controller 922. Network subsystem 918 can include, for example, an Ethernet of WiFi adapter. Input controller 920 can be any known input device technology, including but not limited to a keyboard (including a virtual keyboard), mouse, track ball, and touch-sensitive pad or display. Disk controller 922 can include one or more mass storage devices for storing data files; such devices include magnetic disks, such as internal hard disks and removable disks; magneto-optical disks; and optical disks.

Figure 10:
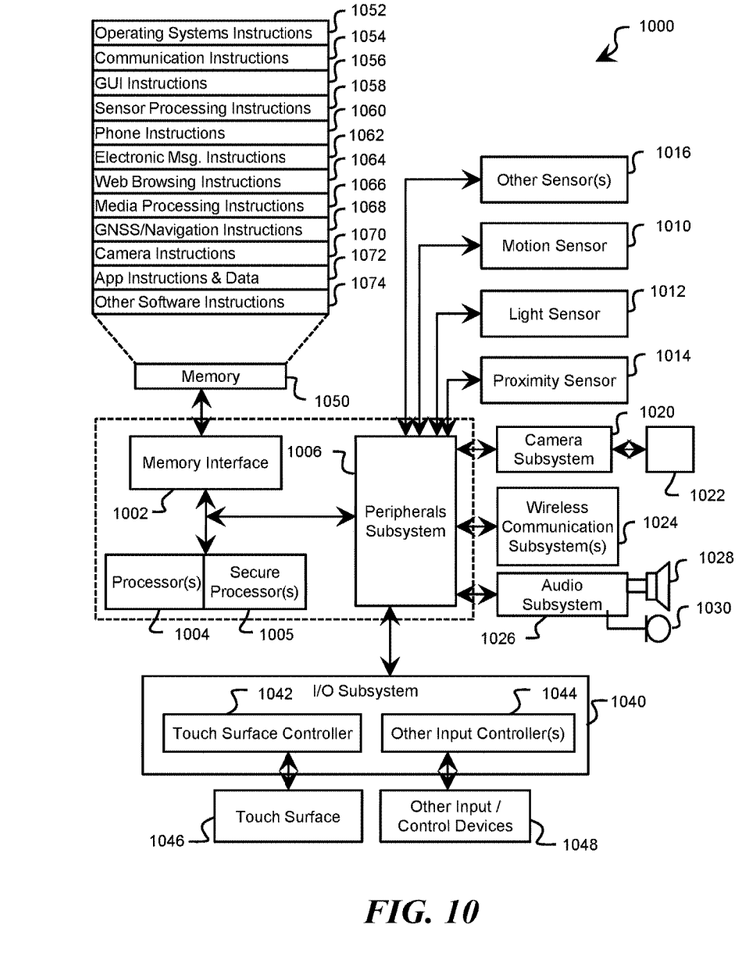
FIG. 10 is an example computing device that can be used within the system of FIG. 1 according to an embodiment of the present disclosure.

FIG. 10 is an example computing device that can be used within the system 200 of FIG. 2, according to an embodiment of the present disclosure. In some embodiments, device 1000 can be user device 202. The illustrative user device 1000 can include a memory interface 1002, one or more data processors, image processors, central processing units 1004, and or secure processing units 1005, and peripherals subsystem 1006. Memory interface 1002, one or more central processing units 1004 and or secure processing units 1005, and or peripherals subsystem 1006 can be separate components or can be integrated in one or more integrated circuits. The various components in user device 1000 can be coupled by one or more communication buses or signal lines.

Sensors, devices, and subsystems can be coupled to peripherals subsystem 1006 to facilitate multiple functionalities. For example, motion sensor 1010, light sensor 1012, and proximity sensor 1014 can be coupled to peripherals subsystem 1006 to facilitate orientation, lighting, and proximity functions. Other sensors 1016 can also be connected to peripherals subsystem 1006, such as a global navigation satellite system (GNSS) (e.g., GPS receiver), a temperature sensor, a biometric sensor, magnetometer, or other sensing device, to facilitate related functionalities.

Camera subsystem 1020 and optical sensor 1022, e.g., a charged coupled device (CCD) or a complementary metal-oxide semiconductor (CMOS) optical sensor, can be utilized to facilitate camera functions, such as recording photographs and video clips. Camera subsystem 1020 and optical sensor 1022 can be used to collect images of a user to be used during authentication of a user, e.g., by performing facial recognition analysis.

Communication functions can be facilitated through one or more wired and or wireless communication subsystems 1024, which can include radio frequency receivers and transmitters and or optical (e.g., infrared) receivers and transmitters. For example, the Bluetooth (e.g., Bluetooth low energy (BTLE)) and or WiFi communications described herein can be handled by wireless communication subsystems 1024. The specific design and implementation of communication subsystems 1024 can depend on the communication network(s) over which the user device 1000 is intended to operate. For example, user device 1000 can include communication subsystems 1024 designed to operate over a GSM network, a GPRS network, an EDGE network, a WiFi or WiMax network, and a Bluetooth™ network. For example, wireless communication subsystems 1024 can include hosting protocols such that device 1000 can be configured as a base station for other wireless devices and or to provide a WiFi service.

Audio subsystem 1026 can be coupled to speaker 1028 and microphone 1030 to facilitate voice-enabled functions, such as speaker recognition, voice replication, digital recording, and telephony functions. Audio subsystem 1026 can be configured to facilitate processing voice commands, voice-printing, and voice authentication, for example.

I/O subsystem 1040 can include a touch-surface controller 1042 and or other input controller(s) 1044. Touch-surface controller 1042 can be coupled to a touch-surface 1046. Touch-surface 1046 and touch-surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 1046.

The other input controller(s) 1044 can be coupled to other input/control devices 1048, such as one or more buttons, rocker switches, thumb-wheel, infrared port, USB port, and or a pointer device such as a stylus. The one or more buttons (not shown) can include an up/down button for volume control of speaker 1028 and or microphone 1030.

In some implementations, a pressing of the button for a first duration can disengage a lock of touch-surface 1046; and a pressing of the button for a second duration that is longer than the first duration can turn power to user device 1000 on or off. Pressing the button for a third duration can activate a voice control, or voice command, module that enables the user to speak commands into microphone 1030 to cause the device to execute the spoken command. The user can customize a functionality of one or more of the buttons. Touch-surface 1046 can, for example, also be used to implement virtual or soft buttons and or a keyboard.

In some implementations, user device 1000 can present recorded audio and or video files, such as MP3, AAC, and MPEG files. In some implementations, user device 1000 can include the functionality of an MP3 player, such as an iPod™. User device 1000 can, therefore, include a 36-pin connector and or 8-pin connector that is compatible with the iPod. Other input/output and control devices can also be used.

Memory interface 1002 can be coupled to memory 1050. Memory 1050 can include high-speed random access memory and or non-volatile memory, such as one or more magnetic disk storage devices, one or more optical storage devices, and or flash memory (e.g., NAND, NOR). Memory 1050 can store an operating system 1052, such as Darwin, RTXC, LINUX, UNIX, OS X, Windows, or an embedded operating system such as VxWorks.

Operating system 1052 can include instructions for handling basic system services and for performing hardware dependent tasks. In some implementations, operating system 1052 can be a kernel (e.g., UNIX kernel). In some implementations, operating system 1052 can include instructions for performing voice authentication.

Memory 1050 can also store communication instructions 1054 to facilitate communicating with one or more additional devices, one or more computers and or one or more servers. Memory 1050 can include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic messaging-related process and functions; web browsing instructions 1064 to facilitate web browsing-related processes and functions; media processing instructions 1066 to facilitate media processing-related functions and processes; GNSS/Navigation instructions 1068 to facilitate GNSS and navigation-related processes and instructions; and or camera instructions 1070 to facilitate camera-related processes and functions.

Memory 1050 can store application (or "app") instructions and data 1072, such as instructions for the apps described above in the context of FIGS. 2-8. Memory 1050 can also store other software instructions 1074 for various other software applications in place on device 1000.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for determining consensus values of one or more duplicate fields in a document, said method comprising:
   receiving the document from a user device;
   extracting a plurality of key-value pairs associated with a duplicate field within the document;
   encoding the plurality of extracted key-value pairs; and
   processing the plurality of encoded key-value pairs with a trained machine learning process to determine a final value for the duplicate field.

2. The computer-implemented method of claim 1, wherein extracting the plurality of key-value pairs comprises, for each key-value pair:
   extracting a key;
   extracting a value associated with the extracted key;
   generating a confidence score; and
   generating a match confidence score.

3. The computer-implemented method of claim 1, wherein encoding the plurality of key-value pairs comprises:

vectorizing each of the plurality of key-value pairs with a term frequency-inverse document frequency (TFIDF) technique; and
concatenating each of the vectorized key-value pairs into a single vector.

4. The computer-implemented method of claim 1, wherein encoding the plurality of key-value pairs comprises tokenizing the plurality of key-value pairs.

5. The computer-implemented method of claim 4, wherein tokenizing the plurality of key-value pairs comprises tokenizing the plurality of key-value pairs with a bidirectional encoder representations from transformers (BERT) technique.

6. The computer-implemented method of claim 1, wherein processing the plurality of encoded key-value pairs with the machine learning technique comprises analyzing the encoded key-value pairs with a summarization model.

7. The computer-implemented method of claim 6, wherein analyzing the encoded key-value pairs with the summarization model comprises selecting a key-value pair as the final value using an extractive summarization model.

8. The computer-implemented method of claim 6, wherein analyzing the encoded key-value pairs with the summarization model comprises generating a final value for the duplicate field using an abstractive summarization model.

9. The computer-implemented method of claim 1, wherein processing the plurality of encoded key-value pairs with the machine learning technique comprises analyzing the encoded key-value pairs with a named entity recognition (NER) model.

10. The method of claim 9, wherein the NER model comprises one or more constraints to filter candidate key-value pairs.

11. The computer-implemented method of claim 1, further comprising:
extracting metadata from the received document; and
processing the plurality of encoded key-value pairs and the extracted metadata with the trained machine learning process.

12. A computer-implemented method for determining consensus values of one or more duplicate fields in a document, said method being performed on a computer and comprising:
receiving the document from a user device;
extracting a plurality of key-value pairs associated with a duplicate field within the document;
generating a confidence score for each of the plurality of key-value pairs; and
processing the plurality of key-value pairs with a rule-based technique to determine a final value for the duplicate field.

13. The computer-implemented method of claim 12, wherein processing the plurality of key-value pairs with a rule-based technique comprises:
mapping each key-value pair to a pre-defined key set associated with the document; and
identifying a key-value pair with a majority vote.

14. The computer-implemented method of claim 12, wherein processing the plurality of key-value pairs with a rule-based technique comprises:
mapping each key-value pair to a pre-defined key set associated with the document;
calculating a plurality of edit distances between a key of the pre-defined key set and the keys of the key-value pairs; and
identifying a key-value pair with a lowest edit distance among the plurality of edit distances.

15. The computer-implemented method of claim 14, wherein calculating an edit distance comprises computing a Levenshtein distance between the key of the key-value pair and a key of the pre-defined key set.

16. The computer-implemented method of claim 12, further comprising:
transforming each of the confidence scores into an accuracy value;
wherein processing the plurality of key-value pairs with the rule-based technique comprises analyzing the accuracy values to determine the final value.

17. The computer-implemented method of claim 16, wherein transforming each of the confidence scores into an accuracy value comprises:
extracting metadata from the received document; and
computing, based on the extracted metadata and the confidence scores, the accuracy value with a machine learning technique.

18. A system for determining consensus values of one or more duplicate fields in a document, the system comprising:
a computing device configured to:
receive a document from a user device;
extract a plurality of key-value pairs associated with a duplicate field from the document;
generate a confidence score and a match confidence score for each of the plurality of key-value pairs;
filter the plurality of key-value pairs with at least one rule-based technique to determine a plurality of candidate key-value pairs;
encode the plurality of candidate key-value pairs; and
process the plurality of encoded candidate key-value pairs with a machine learning technique to determine a final value for the duplicate field.

19. The system of claim 18, wherein processing the plurality of encoded candidate key-value pairs with the machine learning technique comprises analyzing the encoded key-value pairs with at least one of a summarization model or a named entity recognition (NER) model.

20. The system of claim 18, further comprising extracting metadata from the received document;
wherein processing the plurality of encoded candidate key-value pairs with the machine learning technique comprises analyzing the encoded key-value pairs and the extracted metadata with an answer-ranking model.

* * * * *